March 13, 1945.  M. RUSSELL  2,371,188
MEANS FOR CLEARING PIPE SYSTEMS
Filed Feb. 28, 1942  2 Sheets-Sheet 1

INVENTOR.
MIKE RUSSELL.
BY
Rudolf Wilderman
ATTORNEY

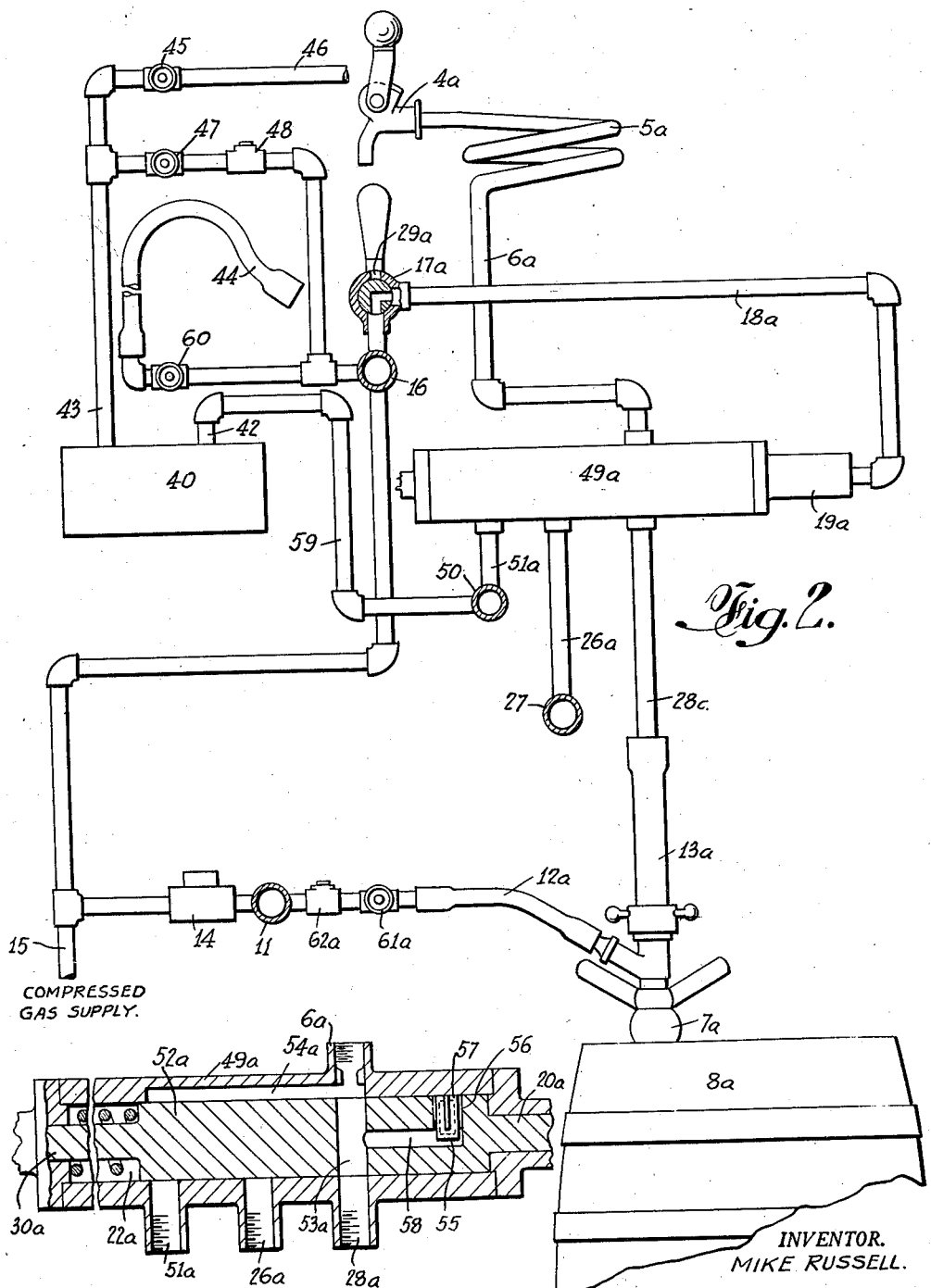

Patented Mar. 13, 1945

2,371,188

UNITED STATES PATENT OFFICE 2,371,188

MEANS FOR CLEARING PIPE SYSTEMS

Mike Russell, Bayonne, N. J.

Application February 28, 1942, Serial No. 432,892

12 Claims. (Cl. 225—12)

This invention concerns a method of and means for clearing pipe systems, so that they offer a clean and unobstructed flow for a fluid to be contained therein and to be conveyed thereby.

This invention provides for means and steps serving to reduce corrosion and the formation of sediment in a pipe system, while it is not in use. It further provides steps and means for the removal of sediment and corrosive matter which have formed in a pipe system.

According to further objects of this invention I provide arrangements for:

(1) Facilitating the operation of clearing a pipe system, by a regular attendant and even for an inexperienced user, so that such operation may be performed as a matter of routine and at regular, short intervals, as circumstances may require. This applies in particular to conditions where the pipe system leads up to a dispenser of beverages, such as water, milk, coffee, beer, etc., and where for sanitary and other reasons the utmost caution and cleanliness are paramount.

(2) Using a single clearing unit for a plurality of pipe systems, the clearing operation of any one particular pipe system interfering, however, in no way or manner with the normal operation and use of the other pipe systems.

(3) Performing the clearing operation—as to one or as to a multiplicity of pipe systems—at or near one restricted location. If the attendant or operator is for instance normally positioned near the dispensing end of a pipe system or of several pipe systems, the clearing is to be controlled from such location, although the pipe systems may extend to one or more remote points, for instance to a storage space of the liquid to be dispensed which space is outside of or in the cellar of a building.

(4) Causing least disturbance in the set up of a pipe system in adding means for clearing operations; in a preferred embodiment of this invention only one control valve is introduced in connection with each pipe system to be serviced.

(5) Safeguarding the supply of the fluid to be dispensed. While arrangements are herein made, for instance, to withdraw portions of the fluid to be dispensed from the pipe system to be cleared into a source of supplies thereof, the arrangement prevents other liquids, which may fill such pipe system, from flowing back into the supply container. Or there are to be provisions preventing the clearing operation to be performed before the pipe system has been emptied of the fluid to be dispensed therefrom.

(6) Cleansing thoroughly with a gas, air for instance, a cleaning solution or other fluids, or several fluids in rotation or combined, and rinsing thereafter, e. g., with water, and then again removing such water.

These and other objects of this invention will be better understood from the following exemplary description thereof, which is rendered however only for purposes of illustration and not in limitation of the scope of the invention.

In the schematic views of the drawings:

Fig. 2 shows an elevation of a modified embodiment of this invention.

Fig. 3 is a cross-sectional view of a valve used in connection with the last embodiment.

Figure 1:
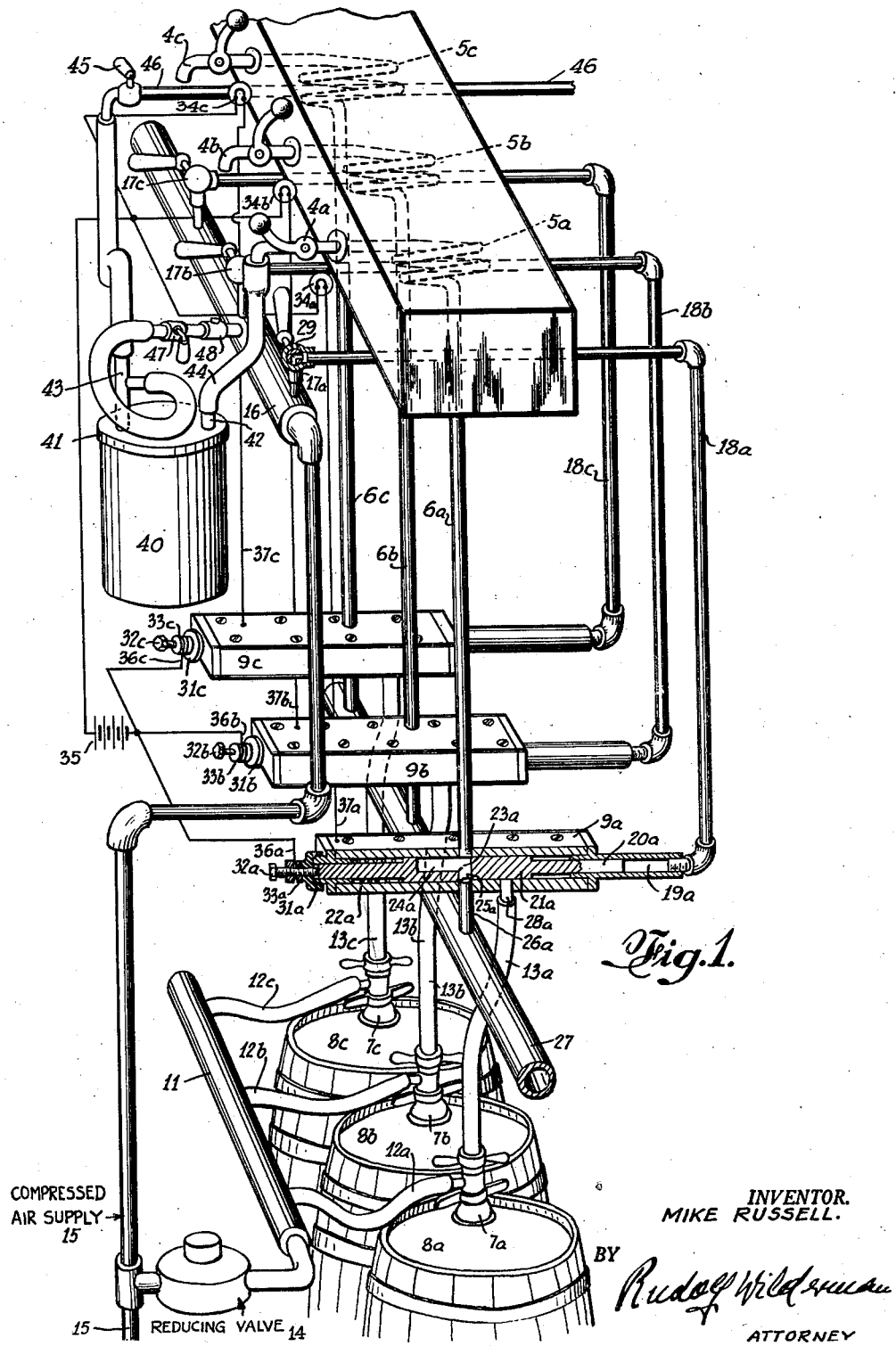
Fig. 1 is a perspective view of means of this invention arranged to be used in connection with the plurality of units, the number of units exemplarily chosen for this illustration being three.

Similar numerals refer to similar parts throughout the various views. Where a plurality of like pipe systems and the corresponding units are shown, three such units being shown in connection with the illustration of Fig. 1, like numerals are used in connection with the corresponding parts of these systems and units, but the three units and pipe systems are differentiated from each other by a suffix $a$, $b$, or $c$, respectively, applied to similar numerals for corresponding parts.

The dispensing of beer, as for instance in connection with a bar, represents a major field, in which the instant invention may be applied and such application is herein used as example for specific illustrations of embodiments of the invention. The invention is however not to be limited to that particular field, but may, by analogy, be put to use in connection with pipe systems serving for other liquids, as it is within the realm of the mechanical skill of those acquainted in these arts.

Substantially in agreement with the accustomed or standard arrangement Fig. 1 shows the predeterminedly spaced faucets 4 to the front of a cooling chamber 10, each faucet connecting with a cooling coil 5 of the respective pipe system 6.

The lower end of a pipe system 6 is ordinarily arranged for detachable connection to a barrel. Concerning the latter the drawing shows the barrels 8 each one of which has a standard tap 7. Such a standard tap customarily has an intake upon the side of a suitable pressure gas, such as carbon dioxide or air, and for such purpose a flexible connection 12 extends in the drawings from the side of each tap 7 to a common gas manifold 11 and each connection 12 may have a control valve and a check valve preventing return flow these valves being shown only in Fig. 2 at 61a and 62a, respectively.

Another flexible connection 13, which ordinarily would connect the tap 7 with the pipe system 6 is shown to be connected to a special valve 9, each valve 9 being arranged at the lower end of a pipe system 6.

Having so far described the parts which substantially agree with the prior art except for the valve arrangements, I shall now describe the details pertaining to the features and principles of my invention:

A predetermined gas pressure, such as ordinarily applied by way of a connection 13 and a tap 7 to a barrel 8, is set up in the manifold 11 by way of a reducing valve 14 connecting to a supply 15 of gas, e. g., air, at a still higher pressure. The air is supplied at that higher pressure to a manifold 16 which is shown to be extended across, below the faucets, and each one of the air outlets serviced by the cocks 17 is allocated with one of the three faucets 4 and the respective pipe system 6. Each cock 17 is shown to be connected by a pipe line 18 to a cylinder portion 19 of the respective special valve 9, so that air passed to said cylinder portion 19 will act upon the piston formation 20 of the slide 21 of the respective valve and presses that slide 21 over to the left against the reaction of a compression spring 22. In that last mentioned position the valve 9a is shown in the view of Fig. 1.

Each slide 21 has a recess 23 having an elongated portion 24 at the top side of the slide, but extending through to the bottom side of the slide merely by way of a hole 25.

The elongated top portion 24 of recess 23 registers in all positions of the slide 21 with the port, at which the respective pipe system 6 opens upon the top of the housing of the valve 9. But hole 25 of recess 23 communicates with a nipple 26 connecting to drain manifold 27, when the valve 9 is actuated, whereas such hole 25 registers with a nipple 28 extending into the bottom of the housing of the valve, when the valve 9 is in a normal position, in which the slide 21 is pushed over to the right by way of action of spring 22. Nipple 28 connects to the flexible connection 13 of tap 7.

Valve 9 is in the actuated position, in which valve 9a is shown, when the cylinder chamber 19 is under the pressure of the compressed air supply 15 while the respective cock 17 is in the open position shown at 17a. But when such cock is swung into the alternative position, in which cocks 17b and 17c are shown, chamber 19 is disconnected from manifold 16 and the compressed air contained in said cylinder chamber 19 may escape to the atmosphere by way of the vent opening 29 of the cock 17. Air pressure on piston portion 20 being thus released, spring 22a will push the slide 21 over to the right into a normal position or into a position of rest of the valve 9, in which position pipe system 6 connects with the barrel 8.

The cylindrical left end of slide 21 is surrounded by the compression spring 22 and slidably extends into a circular bore in the valve housing, which bore is outwardly closed by insulated cap 31. Cap 31 centrally accommodates a stop screw 32, which may be set in any preferred position by way of nuts 33. Stop screw 32 arrests the slide 21 in an actuated position of the valve 9, and is conductively connected with the valve housing, when the left end of slide 21 bears thereagainst in such actuated position of the valve.

In connection with each unit a signal device is provided at or near the respective faucet. Serving as such signal device electric bulbs 34 are indicated in the embodiment of Fig. 1. Such bulbs 34 are connected with a suitable source of current 35, and the circuit of each one of said bulbs has two terminals 36 and 37 which are clamped between the nuts 33 on stop screw 32 and connected to the housing or valve 9, respectively. A signal bulb 34 will therefore be lit as long as the respective valve 9 is in an actuated position.

A jar or vessel 40 is shown to be provided with a screw cap 41, so that it may be filled with a cleaning fluid, or with a cleaning powder which dissolves in water. Cap 41 provides a connection 42 for a hose 44 to the inside of the jar or vessel 40. The other end of hose 44 may be slipped onto any of the faucets 4, and is shown to be so connected with the faucet 4a. Upon the other side of cap 41 a double connection 43 connects to and opens upon the inside of the jar or vessel 40. Double connection 43 connects by way of valve 45 to a water supply 46, and by way of a cock 47 to the compressed air manifold 16. Between cock 47 and manifold 16 a check valve 48 is indicated, such check valve permitting passage of a fluid in one direction only, i. e., from the manifold 16 to the valve 47, but not in the opposite direction. This serves as a precaution for preventing water from entering upon the air system.

My invention provides for the following use of the embodiment just described and for the following processes:

It may be desirable, e. g., for cleaning, to empty the pipe system. Or the contents are to be emptied out of the pipe system 6 into a barrel 8 for a period, e. g., at night time, when the apparatus is not in use. For such purpose hose 44 is slipped onto a faucet 4a of the pipe system 6a to be emptied, the respective cock 17a being in an off-position, i. e., valve 9a is not actuated and the respective pipe system 6a connects to the respective barrel 8a. Now faucet 4a and cock 47 are opened. The compressed air will pass through jar or vessel 40, out therefrom to connection 42—said connection 42 extending preferably only for a short distance into the vessel or jar 40—through hose 44 into faucet 4a, and will from that point on push back the liquid contained in the system 6a down into the barrel 8a. When that has been accomplished cock 47 and faucet 4a may be shut off again.

If this operation of emptying the contents from the pipe system 6 is to be followed up by an operation of cleaning said pipe system, or if such cleaning operation is to be independently brought about, I proceed as follows:

Cock 17a is opened, i. e., it is shifted from a position, in which the other cocks 17b and 17c are shown in their own position of Fig. 1. When the valve 9a has thus been actuated and the pipe system 6a is connected to the drain 27, which is the position shown in the drawings, this will be indicated by signal light 34a which will burn as long as valve 9a is actuated.

Jar or vessel 40 is then suitably filled with a cleaning fluid or with a cleaning powder. After said vessel or jar 40 has been resealed into the screw cap 41, valve 45 and faucet 4a are opened. The flow of water from the water supply 46 will then push the cleaning fluid out of the jar or vessel 40 through hose 44, which has been slipped onto faucet 4a, and through the pipe system 6a down into drain 27. For such purpose the double connection 43 preferably extends down to a point close to the bottom of vessel or jar 40, so that the cleaning fluid will be pushed ahead of the water. Or, if a cleaning powder is contained in jar or vessel 40, then the water passed in through double connection 43 will dissolve such powder and will push the solution through the pipe system 6a, thus cleaning such pipe system. The flow of cleaning fluid or cleaning solution will be followed by a flow of water, so that the pipe system 6a is rinsed after it has been cleansed. Then the valve 45 and the water supply may be shut off, and all water may be removed from pipe system 6a by turning on the cock 47. After that has been accomplished, cock 47 is shut off again, faucet 4a is closed, hose 44 is disconnected from such faucet, cock 17a is turned off and the extinguishing of the signal light 34a will indicate that the pipe system is again ready for dispensing beer from a barrel 8a.

Fig. 2 shows only one unit, e. g., that going with pipe system 6a. But a manifold 11 for air at reduced pressure, a high pressure manifold 16 and a drain manifold 27 indicate, that in this embodiment a plurality of units or systems may be serviced in the same manner as it was shown and described in connection with the modification of Fig. 1. Another cleaning manifold 50 is here added and connects, by way of nipple 51 to the modified special valve 49. The bottom connection 51 represents on each of the valves 49 an extreme left position, to which the pipe system 6 connects by way of a longitudinal clearance groove 54 in the valve housing and through a vertical opening 53 in slide 52, when valve 49 is actuated, i. e., when slide 52 has been pushed into its extreme position to the left by air pressure admitted through pipe 18 and in reaction against compression spring 22. The operative relationship between parts 6, 28 and 51 is therefore exactly the same in valve 49, as it was between connection 6, 28 and 26 in connection with the special valve 9 of the embodiment of Fig. 1.

In valve 49 the drain connection 26 occupies merely an intermediary bottom position, at which the slide opening 53 will be stopped when slide 52 moves from the left to the right in case the float 55 is buoyed, as it will be presently explained:

As a whole the float 55 is lighter in specific weight than the liquid circulated in a pipe system hereof, being for instance made hollow for such purpose. Float 55 is arranged so that it never interferes with any flow of liquids, e. g., it is shown to have fins 57 upon its outside, by way of which it is slidably guided in a vertical bore 56. That vertical bore 56 communicates with the vertical opening 53, e. g., by a horizontal connecting channel 58 at its bottom end. When there is no liquid in the bore 56, float 55 will rest at the bottom of said bore, i. e., in a position slightly lower than that shown in Fig. 3. But the float 55 will be buoyed into the position, in which it is shown in Fig. 3, and will then slidably abut against the bottom of the top portion of the housing of valve 49, as shown. If the slide 52 is shifted from the position shown in Fig. 3 to the extreme left of the valve 49 while the float 55 is thus buoyed, float 55 may float into even a higher position, sliding against the top side of groove 54. But a return movement of the slide from an extreme left position to an extreme right position is not possible while the float 55 is thus buoyed, because the floating float 55 will arrest such movement when it has arrived at the right end of groove 54. The ungrooved portion of the top side of the housing of valve 49 then presents an obstruction, past which the floated or buoyed float 55 and with it the slide 52 cannot be pushed further to the right. At this position, where the movement of the slide from the left to the right is arrested, hole 53 registers with the drain connection 26, i. e., the contents of the pipe system 6a may now run down into the drain manifold 27. This will also drain the bore 56, so that the float 55 then drops into a bottom position in said bore, in which it will not obstruct any movement of the slide. If the float should be caught in an elevated position by reason of being pushed against and wedged by said obstruction, another actuation of the valve by opening cock 17 will release the float 55, so that it may drop into its lowest position in bore 56.

That arrangement serves the following purpose:

It is to be prevented that any cleaning solution, which might be contained in the pipe system 6, shall ever mix with beer supplied from a barrel 8. Should, therefore, a careless operator disconnect the air supply actuating valve 49 by shutting off cock 17 while the pipe system 7 contains a cleaning or rinsing solution, then the buoyed float 55 will prevent the pipe system filled with cleaning fluid or water to be connected with barrel 8 and the position of Fig. 3, i. e., a connection between the pipe system 6 and barrel 8 can only be restored after all contents have been drained from the pipe system 6.

Except for the foregoing modification a special valve 49 may be arranged like a valve 9. But on account of the above mentioned precaution, and because no cleaning solution may be passed according to the arrangement now to be described through the pipe system 6 as long as such pipe system 6 is connected with the liquid supply, the electric alarm device may be done without in this case.

Manifold 50 is shown to be connected by a single pipe line 59 to the outlet connection 42 of vessel 40. The hose 44 which had previously extended in the modification of Fig. 1 from said connection 42, is now directly connected to air manifold 16 by way of a control valve 60.

The mode of operation of an arrangement of the embodiment of Fig. 2 is similar to that described in connection with Fig. 1, as far as a draining of a pipe system 6 into a source of supply 8 is concerned: Hose 44 is slipped onto the faucet 4 belonging to the pipe system, the contents of which are to be drained into the respective supply vessel. Faucet 4 and high pressure air control valve 60 are opened, and are closed again when the liquid, e. g., the beer has been pushed back into barrel 8. During this operation cock 17 was of course shut off, as it is during a normal use of the pipe system 6 when valve 49 is in the position shown in Fig. 3.

For a cleaning of the pipe line cock 17 is open so that valve 49 is actuated and pipe system 6 connects with the nipple 51 leading to cleaning manifold 50. A cleaning fluid contained in vessel 40 may now be pushed into said manifold 50 by placing it under the pressure of the water supply 46, valve 45 being opened for such purpose. If now the respective faucet 4 is open, the water pressure will push the cleaning fluid up from manifold 50 through the respective special valve 49 and through the respective pipe system 6 out of said faucet 4 into a waste or drain, which is customarily arranged below a faucet 4. While this flow continues the cleaning fluid will be followed by water which rinses the pipe system and eventually the water may in turn be pushed out of the pipe system by turning off valve 45 and turning on high pressure air valve 47. When that operation is finished valve 47 is shut off again and so is cock 17. The valve 49 having thus been returned to its normal position, beer will immediately be pushed up from the barrel 8 through pipe system 6 to the faucet 4 and will issue from said faucet until it is shut off.

Having thus described my invention in detail, yet I do not wish to be limited thereby, except as the appended claims may require, for it is obvious that various modifications and changes may be made in the form of embodiment of my invention, without departing from the spirit and scope thereof.

What I claim is:

1. The combination of a liquid supply, of a faucet connected for drawing from said liquid supply at a point removed from said liquid supply, and of a connecting line between said supply and faucet, with a predeterminedly compressed gas supply, a reducing valve connecting said gas supply with said liquid supply and placing the latter under a gas pressure which is below the predetermined pressure of said gas supply but suffices to propel liquid through said connecting line from said liquid supply to said faucet, a hose on said predeterminedly compressed gas supply adapted to connect it onto said faucet and pushing, when thus connected and the faucet is open, any liquid which may have been propelled from said liquid supply towards said faucet back into said liquid supply, a container for a cleanser interposed in said hose, and means for delivering water to said container.

2. The combination of a liquid supply, of a faucet connected for drawing from said liquid supply at a point removed from said liquid supply, and a connecting line between said supply and faucet, with a predeterminedly compressed gas supply, a reducing valve connecting said gas supply with said liquid supply and placing the latter under a gas pressure which is below the predetermined pressure of said gas supply but suffices to propel liquid through said connecting line from said liquid supply to said faucet, a valve controlled extension on said predetermined compressed gas supply adapted to be detachably connected to said faucet and pushing, when thus connected and the faucet is open, any liquid which may have been propelled from said liquid supply towards said faucet back into said liquid supply, cleansing means including a container interposed in said extension, and means for delivering water to the container, and a two way valve between said connecting line and liquid supply for opening said connecting line for draining instead of connecting it to said supply, said valve being pneumatically controlled in connection with the faucet.

3. In combination with a pipe system which connects a source of a liquid with a faucet and conditions the liquid before it reaches the faucet, a pneumatically controlled valve at the intake of the pipe system, a slide in said valve connecting said system to the source of a liquid in one extreme position of movement, a spring normally pressing said slide into said position, a gas chamber into which said slide extends and connected with a source of gas for pushing said slide in reaction to said spring into another extreme position in which said source of a liquid is shut off and said valve and pipe system are open for draining, an electric circuit, a switch in said circuit mounted on said valve and closed by said slide when in said other extreme position, an electric signal device in said circuit and located near said faucet, and a three-way cock located near said faucet, interposed between said gas chamber and said source of gas, and admitting gas from said source of gas to said gas chamber in one operative position and shutting off said source of a liquid and releasing to the outside gas contained in said chamber, when in another operative position.

4. Means for cleaning a pipe system which connects a source of a liquid with a faucet and conditions the liquid before it reaches the faucet, a supply of a cleaning fluid for said system, a slide valve housing interposed between said system and said source and said supply, a slide in said valve housing having a recess connected at all times with said system and connected with said source in a first, and with said supply in another extreme position of said slide, control means for reciprocating said slide in said valve, an obstruction in said housing, and a float in said recess adapted to be floated by a liquid that may be contained in said recess, said float engaging on said obstruction and stopping movement of said slide into said first extreme position when it is floated while the slide is near said other extreme position.

5. Means for cleaning a pipe system which connects a source of a liquid with a faucet and conditions the liquid before it reaches the faucet, a supply of a cleaning fluid for said system, a slide valve housing interposed between said system and said source and said supply, a slide in said valve housing having a recess connected at all times with said system and connected with said source in a first, and with said supply in another extreme position of said slide, control means for reciprocating said slide in said valve, an obstruction in said housing, a float in said recess adapted to be floated by a liquid that may be contained in said recess, said float engaging on said obstruction and stopping movement of said slide into said first extreme position when it is floated while the slide is near said other extreme position, and a drain opening from said housing and connecting with said recess when said slide is stopped at a position where said float engages on said obstruction.

6. Means for cleaning pipe systems each of which connects a source of a liquid with a faucet and conditions the liquid before it reaches the faucet comprising a vessel containing a cleaning fluid for said systems, slide valve housings each interposed between one of the said systems, the respective source of a liquid, and the said vessel, a slide accommodated in each of said housings and having a recess connected at all times with the respective system and connected with the respective source of a liquid in a first, and with said vessel in another extreme position of the respective slide, separate control means for each slide valve, an obstruction in each housing, and a float in each recess adapted to be floated by a liquid filling such recess, each float engaging the respective obstruction and stopping, when floated, movement of the respective slide from said other into said first extreme position.

7. Means for cleaning pipe systems each of which connects a source of a liquid with a faucet and conditions the liquid before it reaches the faucet comprising a vessel containing a cleaning fluid for said systems, slide valve housings each interposed between one of the said systems, the respective source of a liquid, and the said vessel, a slide accommodated in each of said housings and having a recess connected at all times with the respective system and connected with the respective source of a liquid in a first, and with said vessel in another extreme position of the respective slide, separate control means for each slide valve, an obstruction in each housing, and a float in each recess adapted to be floated by a liquid filling such recess, each float engaging the respective obstruction and stopping, when floated, movement of the respective slide from said other into said first extreme position, said housings opening to a common drain at points, which register wtih the lower ends of the recesses of the respective slides whenever the respective slide is stopped by engagement of the respective float by the respective obstruction.

8. Means for cleaning pipe systems each of which connects a source of a liquid with a faucet and conditions the liquid before it reaches the faucet comprising a vessel containing a cleaning fluid for said systems, slide valve housings each interposed between one of said systems, the respective source of liquid, and a drain, a slide accommodated in each of said housings and having a recess connected at all times with the respective system and connected with the respective source of a liquid in a first, and with a drain in another extreme position of the respective slide, separate control means for each slide valve, an obstruction in each housing, and a float in each recess adapted to be floated by a liquid filling such recess, each float engaging the respective obstruction and stopping, when floated, movement of the respective slide from said other into said first extreme position, a means of remote control for each of said valve slides at the respective faucet, and a hose for connecting said vessel at random to any one of said faucets.

9. Means for cleaning pipe systems each of which connects a source of a liquid with a faucet and conditions the liquid before it reaches the faucet comprising a vessel containing a cleaning fluid for said system, slide valve housings each interposed between one of said systems, the respective source of liquid, and a drain, a slide accommodated in each of said housings and having a recess connected at all times with the respective system and connected with the respective source of a liquid in a first, and with a drain in another extreme position of the respective slide, separate control means for each slide valve, an obstruction in each housing, and a float in each recess adapted to be floated by a liquid filling such recess, each float engaging the respective obstruction and stopping, when floated, movement of the respective slide from said other into said first extreme position, a means of remote control for each of said valve slides at the respective faucets, a valve connecting said vessel to a supply of water, and a hose for connecting said vessel at random to any one of said faucets.

10. Means for cleaning pipe systems each of which connects a source of liquid with a faucet and conditions the liquid before it reaches the faucet comprising a vessel containing a cleaning fluid for said systems, slide valve housings each interposed between one of said systems, the respective source of liquid, and a drain, a slide accommodated in each of said housings and having a recess connected at all times with the respective system and connected with the respective source of a liquid in a first, and with a drain in another extreme position of the respective slide, separate control means for each slide valve, an obstruction in each housing, and a float in each recess adapted to be floated by a liquid filling such recess, each float engaging the respective obstruction and stopping, when floated, movement of the respective slide from said other into said first extreme position, a means of remote control for each of said valve slides at the respective faucet, valves connecting said vessel to supplies of water and compressed air, and a hose for connecting said vessel at random to any one of said faucets.

11. Means for cleaning pipe systems each of which connects a source of liquid with a faucet and conditions the liquid before it reaches the faucet comprising a vessel containing a cleaning fluid for said systems, slide valve housings each interposed between one of said systems, the respective source of liquid, and a drain, a slide accommodated in each of said housings and having a recess connected at all times with the respective system and connected with the respective source of a liquid in a first, and with a drain in another extreme position of the respective slide, separate control means for each slide valve, an obstruction in each housing, and a float in each recess adapted to be floated by a liquid filling such recess, each float engaging the respective obstruction and stopping, when floated, movement of the respective slide from said other into said first extreme position, a means of remote control for each of said valve slides at the respective faucet, an electric signalling device at each of said faucets, switches each controlling one of said devices and each actuated by the slide controlling the pipe system connected to the respective faucet, and a hose for connecting said vessel at random to any one of said faucets.

12. In combination with a dispensing system comprising a faucet, a fluid supply, a pipe system connecting said fluid supply with said faucet, a cleaning system including a container having an outlet and a hose extending therefrom for detachable engagement with said faucet, means for delivering water to said container, a manifold, means for supplying air under pressure to said manifold, valve-controlled means for delivering air from said manifold to said container, a valve interposed between said pipe system and the fluid supply and having two alternative operating positions, a drain associated with said valve, said valve connecting said pipe system with said fluid supply in one of its operative positions and shutting off the cleaning system, and in its second operative position said valve shutting off the fluid supply and connecting the pipe system with the cleaning system and the drain, and valve controlled means for delivering air from said manifold to said valve and for moving said valve into either of its two positions.

MIKE RUSSELL.